(12) United States Patent
Chakraborty et al.

(10) Patent No.: US 10,733,606 B2
(45) Date of Patent: Aug. 4, 2020

(54) BIOMETRIC AUTHENTICATION FOR PAPER-BASED TRANSACTIONS

(71) Applicant: Bank of America Corporation, Charlotte, NC (US)

(72) Inventors: Pinak Chakraborty, Hyderabad (IN); Udaya Kumar Raju Ratnakaram, Hyderabad (IN); Nagasubramanya Lakshminarayana, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 327 days.

(21) Appl. No.: 15/643,752

(22) Filed: Jul. 7, 2017

(65) Prior Publication Data
US 2019/0012673 A1    Jan. 10, 2019

(51) Int. Cl.
| | |
|---|---|
| *G06Q 20/40* | (2012.01) |
| *G06Q 20/04* | (2012.01) |
| *G07D 7/00* | (2016.01) |
| *G07D 7/20* | (2016.01) |
| *G07D 7/0047* | (2016.01) |
| *G07D 7/206* | (2016.01) |

(52) U.S. Cl.
CPC ..... *G06Q 20/40145* (2013.01); *G06Q 20/042* (2013.01); *G07D 7/003* (2017.05); *G07D 7/0047* (2017.05); *G07D 7/20* (2013.01); *G07D 7/206* (2017.05)

(58) Field of Classification Search
CPC .. G06Q 20/40145; G06Q 20/042; G07D 7/20; G07D 7/0047; G07D 7/206; G07D 7/003

USPC ......................................................... 705/64
See application file for complete search history.

(56) References Cited

U.S. PATENT DOCUMENTS

| | | | |
|---|---|---|---|
| 6,401,206 B1 | 6/2002 | Khan et al. | |
| 7,383,441 B2 | 6/2008 | Vorbrüggen et al. | |
| 8,056,822 B2 | 11/2011 | Bourrieres et al. | |
| 8,256,688 B2 | 9/2012 | Bourrieres et al. | |
| 8,370,632 B2 | 2/2013 | Lehwany | |
| 8,452,689 B1 * | 5/2013 | Medina, III | G06Q 20/042 |
| | | | 705/37 |
| 9,779,392 B1 * | 10/2017 | Prasad | G06Q 20/0425 |

(Continued)

*Primary Examiner* — Neha Patel
*Assistant Examiner* — Duan Zhang
(74) *Attorney, Agent, or Firm* — Weiss & Arons LLP; Michael A. Springs, Esq.

(57) ABSTRACT

Apparatus and methods for protecting biometric authentication information associated with a paper document are provided. A mobile device application may pre-associate the document with a biometric input. The mobile device application may generate a first composite hash value based on a combination of a numerical representation of a first image of the paper document and a numerical representation of a first biometric input. Subsequently, an authentication server may generate a second composite hash value based on a combination of a numerical representation of a second image of the paper document and a numerical representation of a second biometric input. The authentication server may determine whether an edit distance separating the second composite hash value and the first composite hash value is less than a threshold distance. If the edit distance is less than a threshold distance, the paper document may be authenticated.

11 Claims, 7 Drawing Sheets

(56) References Cited

U.S. PATENT DOCUMENTS

| | | | | |
|---|---|---|---|---|
| 2005/0027543 | A1* | 2/2005 | Labrou | G06Q 20/02 |
| | | | | 705/26.35 |
| 2012/0314911 | A1* | 12/2012 | Paul | G06F 21/32 |
| | | | | 382/115 |
| 2016/0247042 | A1* | 8/2016 | Chao | G06K 9/481 |
| 2018/0262511 | A1* | 9/2018 | Guo | H04L 63/102 |
| 2018/0331833 | A1* | 11/2018 | Tomlinson | H04L 63/0861 |

* cited by examiner

BIOMETRIC AUTHENTICATION FOR PAPER-BASED TRANSACTIONS

FIELD OF TECHNOLOGY

This disclosure relates to authentication of paper-based transactions. Specifically, this disclosure relates to protecting biometric authentication information that is associated with a paper document or financial instrument.

BACKGROUND

Business transactions often require paper documents issued by one of the transaction parties. The issuing party may transfer the paper document to another transaction party. For example, one party may issue a paper check as payment to another party.

At some point after the paper document has been transferred, the validity of the document may require authentication. In the case of a paper check, the check may require authentication at the time it is presented for deposit. The bank of the issuing party may hold payment of the check amount until the bank has verified the identity of the issuing party.

Conventionally, a paper document is authenticated based on a signature. In the case of a paper check, the bank of the issuing party may verify the signature of the issuing party on a check presented for deposit. The bank may authenticate the check based on the customer signature.

Authenticating a document based on a signature presents serious security risks. A signature may be forged or otherwise imitated. A more secure method of authentication relies on a unique biometric indicator such a fingerprint or a retinal scan. However, a paper document is not easily adapted to incorporate such forms of biometric authentication. Moreover, associating a biometric indicator with a paper document exposes sensitive biometric information to tampering or theft.

It would be desirable, therefore, to provide apparatus and methods that incorporate biometric authentication into a paper-based transaction. It would be desirable to provide biometric authentication in a secure manner that protects against exposure of the biometric information.

SUMMARY OF THE DISCLOSURE

Apparatus and methods for protected biometric authentication of a paper-based transaction are provided.

The apparatus and methods may pre-associate a paper document with biometric authentication information. The paper document may be a check.

The check issuer may capture an image of the issued check at a mobile device. The check issuer may capture a biometric input at a mobile device. The mobile device may generate a first composite hash value based on a combination of a numerical representation of the check image and a numerical representation of the biometric input. Combining the biometric input with the check image prior to hashing, renders it extremely difficult for a person of malicious intent to derive the biometric information.

After the check passes out of issuer control, it may be authenticated by an authentication server. The authentication server may receive an image of a paper check for authentication. The authentication server may generate a second composite hash value based on a combination of numerical representation of the check image with a numerical representation of stored biometric registration information. The biometric registration information may have been previously associated with an account.

The authentication server may calculate a distance separating the second composite hash value from the first composite hash value. The distance may be an edit distance. If the edit distance is less than a threshold distance, the authentication server may authenticate the check. The authentication may comprise a release of funds from a check issuer account. If the edit distance is greater than a threshold distance, the authentication server may lock the check issuer account, the locking comprising denying a release of funds from the check issuer account.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1A:
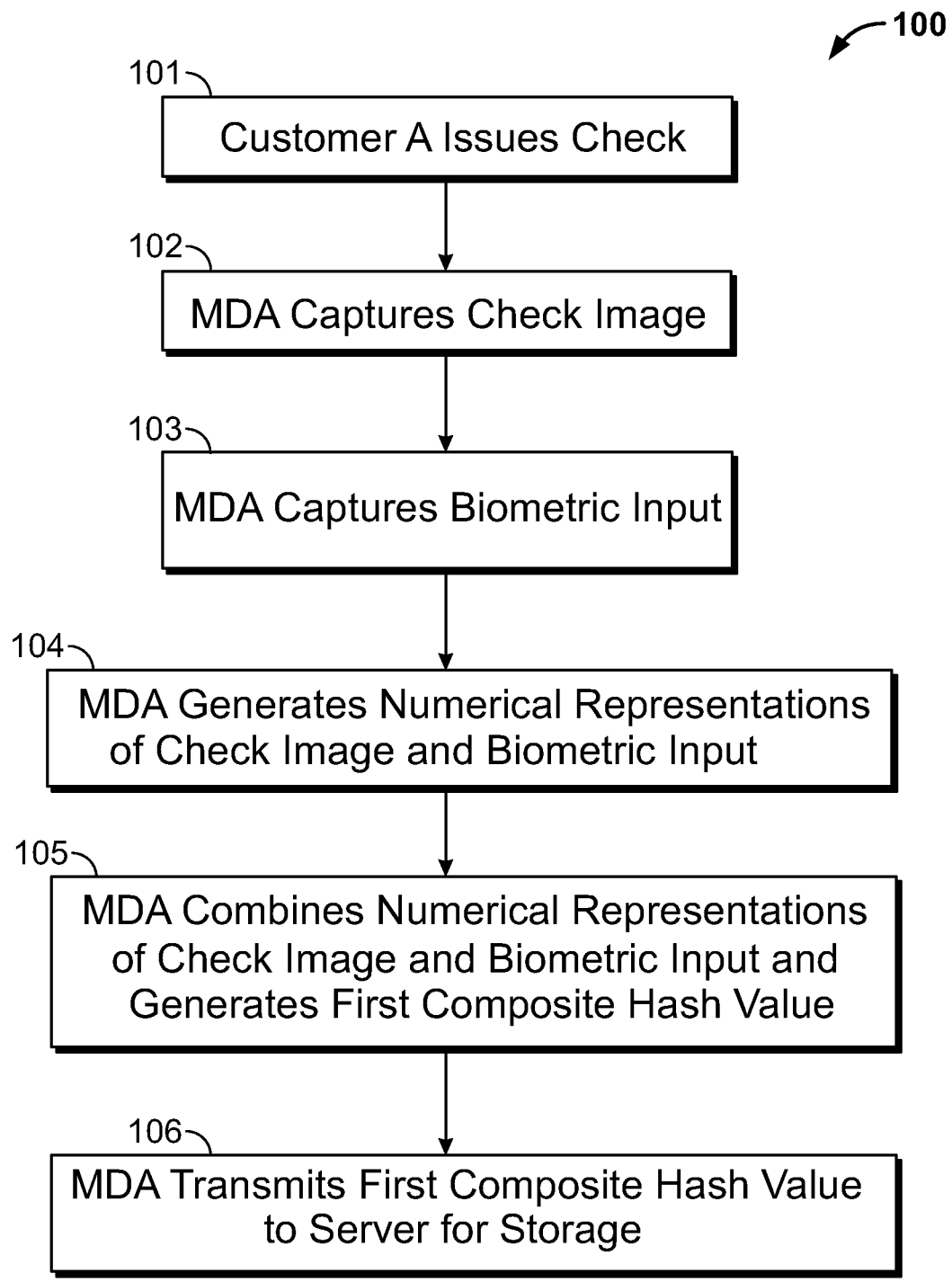
FIG. 1A shows an illustrative process flow in accordance with principles of the invention.

Apparatus and methods for protected biometric authentication of a paper-based transaction are provided. The invention may include methods and apparatus as set forth in application Ser. No. 15/258,110, "Encrypted Biometric Authentication," which is hereby incorporated by reference herein in its entirety.

A transaction involving two or more parties may include one or more paper documents. The paper document may be a financial instrument, a contract, an invoice, an affidavit, or any suitable paper document.

In some embodiments, the paper document may be a paper check. The check issuer may be a customer of a financial institution. The financial institution may provide the customer with a mobile device application for associating an issued paper check with a biometric input. The customer may download the mobile device application from the financial institution to a customer mobile device. The mobile device may be a mobile phone, a smartphone, a smartwatch, a tablet, a laptop, or any suitable mobile device.

The mobile device application may include image capture capabilities. The mobile device application may capture a first image of the paper check.

The mobile device application may include the capability to receive a biometric input. In response to capturing the first check image, the mobile device application may offer the customer an option to associate the image with a biometric input. The mobile device may capture the biometric input. The mobile device may capture the biometric input via a touchscreen, camera, scanner, voice recorder or any other suitable function of the mobile device. The biometric input may be a fingerprint scan, a retinal scan, a voiceprint, a photograph, a heartbeat signature or any other suitable biometric input.

In response to receiving the biometric input, the mobile device application may randomly generate an authentication number. The issuance of a RGAN indicates biometric confirmation of the check image, but the RGAN itself does not include any biometric information.

The randomly generated authentication number (RGAN) may be transferred to the face of the check in any suitable manner. For example, the customer may write or print the RGAN on the face of the check. The mobile device application may transmit the RGAN to the financial institution. The financial institution may store the RGAN. The financial institution may store the RGAN along with other transactional data. The financial institution may store the RGAN on an authentication server.

The mobile device application may generate a numerical representation of the captured first check image. The numerical representation may be generated from a digital file. The numerical representation may be a matrix or any other suitable numerical representation.

The mobile device application may generate a numerical representation of the biometric input. The numerical representation may be generated from a digital file. The numerical representation may be a matrix or any other suitable numerical representation.

The mobile device application may generate a first composite hash value based on a combination of the numerical representation of the first check image and the numerical representation of the biometric input. The mobile device application may use a convolution algorithm or any other suitable method to combine the numerical representations of the check image and the biometric input.

The biometric input and the numerical representation of the biometric input may be restricted to the customer mobile device. In some embodiments, the mobile device application may delete the biometric input and the numerical representation of the biometric input following generation of the first composite hash value.

The mobile device application may transmit the first composite hash value to the financial institution. The financial institution may store the first composite hash value. The financial institution may store the first composite hash value along with other transactional data. The financial institution may store the first composite hash value on an authentication server.

A composite hash value provides a way to associate biometric information with a paper document. Further, the biometric information associated with the document is protected during transmission because it is integrated into the composite hash value. A numerical representation of the biometric input could potentially be intercepted and analyzed to derive the customer biometric information. The composite hash value generated by the mobile device application provides stronger protection, because it is based on a combination of the biometric input and the document image. Restricting transmission to the composite hash value enables association of the document with a biometric indicator, while still protecting sensitive customer information.

When the paper document is a check, using the check image for protective convolution with the biometric input presents several benefits. Because the check image itself is a component of the composite hash value, when the check is presented for authentication, one of the pieces needed to verify the composite hash value is already present. The check itself also includes information for identifying a customer account. Stored biometric information registered with the customer account may provide the other component needed to verify the composite hash value.

An authentication server may receive a second image of a check for authentication. The authentication server may be associated with the customer financial institution. The check may be a check presented for deposit. The check may be presented for deposit at an ATM, at a financial institution branch, via online banking, via a mobile device application, or via any suitable banking channel. The second check image may be captured by the banking channel at the time of deposit. The second check image may be transmitted from the banking channel to the authentication server for authentication.

The authentication server may identify a RGAN in the second check image. The authentication server may identify the RGAN based on a segment extracted from the second check image.

The authentication server may identify transactional data associated with the second check image. The authentication server may identify the transactional data based on a segment extracted from the second check image. The authentication server may determine whether the transactional data includes a stored RGAN. The RGAN in the second check image may be compared to the stored RGAN.

If the RGAN in the second check image does not match the RGAN from the transactional data, the authentication server may decline to authenticate the check. In some embodiments, the authentication server may terminate the authentication process. In some embodiments, the authentication server may attempt to authenticate the check via an alternate method of authentication.

If the RGAN in the second check image matches the RGAN from the transactional data, the authentication server may authenticate the check. In response to authenticating the check, the financial institution may release funds in the amount of the check. The authentication server may require one or more additional forms of verification before authenticating the check. The financial institution may require one or more additional forms of verification before releasing the funds.

Authentication based on a RGAN may be a first level of authentication. In some embodiments, the authentication server may apply a second level of authentication. The second level of authentication may be based on a composite hash value that associates the check with a biometric input. The authentication server may apply a second level of authentication if the RGAN on the face of the check does not match the stored RGAN. Alternatively, the authentication server may apply a second level of authentication if the RGAN does match the stored RGAN. In some embodiments, the authentication server may apply only the first level of authentication or only the second level of authentication.

The authentication server may generate a numerical representation of the second check image. The numerical representation may be generated from a digital image file. The numerical representation may be a matrix or any other suitable numerical representation.

The authentication server may identify a customer account associated with the second check image. The authentication server may identify the account based on a segment extracted from the check image. The authentication server may identify biometric registration information previously associated with the customer account. The biometric registration information may be registered at the time the account is created or at a later time. The biometric registration information may be captured by any suitable banking channel. The biometric registration information may be stored on a secure server. The authentication server may retrieve the stored biometric registration information.

The authentication server may generate a numerical representation of the biometric registration information. The numerical representation may be generated from a digital image file. The numerical representation may be a matrix or any other suitable numerical representation.

The authentication server may generate a second composite hash value that is based on a combination of the numerical representation of the second check image and the numerical representation of the biometric registration. The numerical representations of the second check image and the biometric registration information may be combined via a convolution algorithm or by any suitable method.

The authentication server may calculate a distance separating the second composite hash value from the first composite hash value. The distance may be an edit distance. The edit distance may be a Hamming distance.

The edit distance may be compared to a predetermined threshold distance. If the edit distance is less than the threshold distance, the authentication server may authenticate the check. Authenticating the check may comprise authorizing a release of funds from the customer account. The authentication server may transmit an instruction authorizing the release of funds.

If the edit distance is greater than the threshold distance, the authentication server may decline to authenticate the check. The authentication server may lock the customer account. Locking the customer account may comprise transmitting an instruction denying a release of funds from the customer account.

In some embodiments, the biometric registration information may include multiple versions of a biometric input. For example, when the biometric input is a fingerprint scan, the biometric registration information may include multiple scans with slight differences in finger positioning. The multiple scans ensure that a subsequent biometric input at a mobile device will correspond to the biometric registration information regardless of positioning.

In an embodiment in which the customer biometric registration information includes multiple versions of the biometric input, authentication may include generating numerical representations of each version of the biometric registration information. Each of these numerical representations may be combined with the numerical representation of the second check image to generate a set of second composite hash values. The authentication server may calculate distances separating each of these second composite hash values from the first composite hash value. If any of the distances is less than the threshold distance, the authentication server may authenticate the check.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1B:
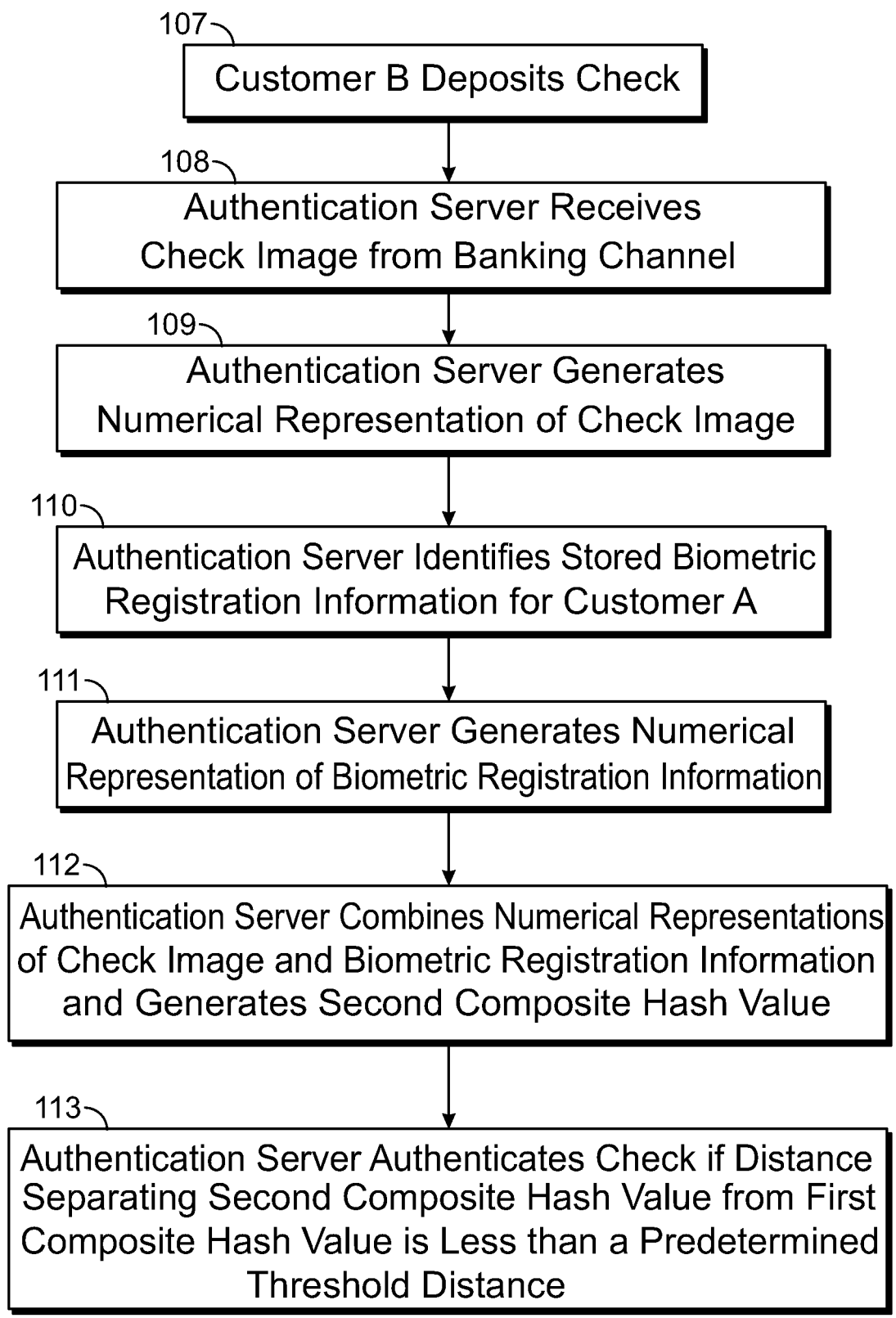
FIG. 1B shows an illustrative process flow in accordance with principles of the invention.

FIGS. 1A and 1B show two parts of illustrative process flow 100. Process 100 shows a biometric authentication process for a paper check. In process 100, Customer A may be a customer of a financial institution. At step 101, Customer A issues a check. The check may be issued as part of a payment to Customer B.

Customer A may be in possession of a mobile device. A mobile device application (MDA) for biometric authentication may be installed on the mobile device. The MDA may be provided by the financial institution. The MDA may be downloaded by the customer from the financial institution.

At step 102, the MDA captures an image of the issued check before it is transferred to Customer B. The MDA may offer Customer A the option to associate the check image with a biometric input. At step 103, the MDA captures a biometric input from Customer A. The biometric input may be a fingerprint scan, a retinal scan, a voiceprint, a photograph, a heartbeat signature or any other suitable biometric input. The MDA may be configured to receive the biometric input using a mobile device touchscreen, camera, scanner, voice recorder or any other suitable function of the mobile device.

At step 104, the MDA generates a numerical representation of the check image. The MDA also generates a numerical representation of the biometric input.

At step 105, the MDA combines the numerical representations of the check image and the biometric input. The MDA may use a convolution algorithm or any other suitable method to combine the numerical representations of the check image and the biometric input. The MDA generates a first composite hash value based on the combination of the numerical representations.

At step 106, the MDA transmits the first composite hash value to a server for storage. The server may be associated with the financial institution. The server may store transaction information. The server may be an authentication server.

FIG. 1B shows additional elements of process 100, following transfer of the paper check to Customer B. At step 107, Customer B deposits the check issued by Customer A. Customer B may deposit the check at a self-service kiosk, via online banking, via a mobile device, at financial center or via any other suitable banking channel. The banking channel may capture an image of the deposited check. The banking channel may transmit the check image to an authentication server for authentication.

At step 108, the authentication server receives the check image for authentication. At step 109, the authentication server generates a numerical representation of the check image.

At step 110, the authentication server identifies biometric registration information for Customer A. The authentication server may identify an account associated with Customer A based on a segment extracted from the check image (not shown). The authentication server may identify Customer A by name from a text segment extracted from the check image. The authentication server may identify biometric registration information previously associated with the Customer A account. The biometric registration information may be a biometric input. The biometric registration information may be stored on a secure server.

At step 111, the authentication server generates a numerical representation of the biometric registration information. At step 112, the authentication server combines the numerical representations of the check image and the biometric registration information. The authentication server may use a convolution algorithm or any other suitable method to combine the numerical representations of the check image and the biometric input. The authentication server generates a second hash value based on the combination of the numerical representations.

The authentication server may calculate a distance separating the second composite hash value from the first composite hash value (not shown). The distance may be an edit distance. At step 113, the authentication server authenticates the check if the distance separating the second composite hash value and the first composite hash value is less than a threshold distance.

Figure 2A:
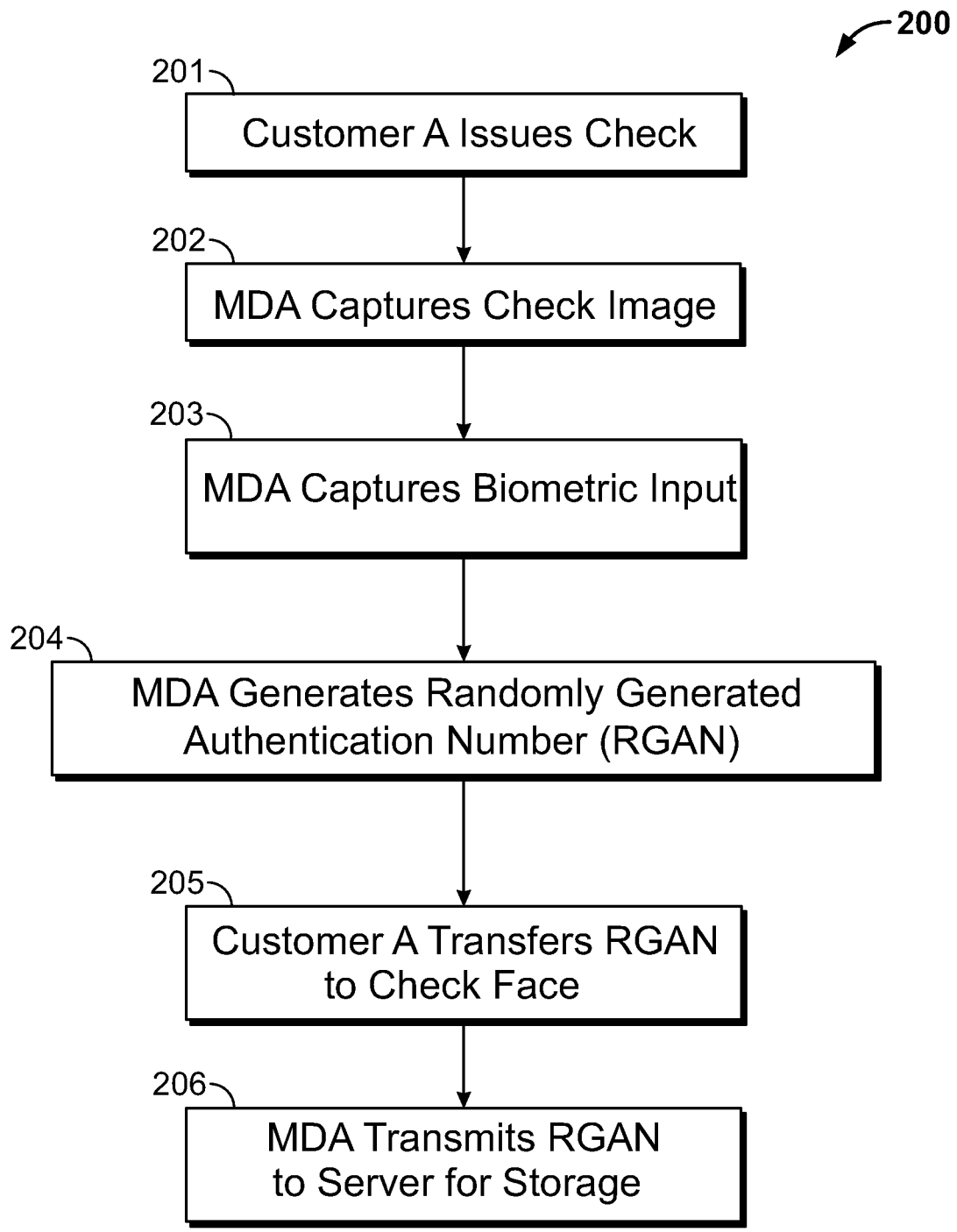
FIG. 2A shows an illustrative process flow in accordance with principles of the invention.
Figure 2B:
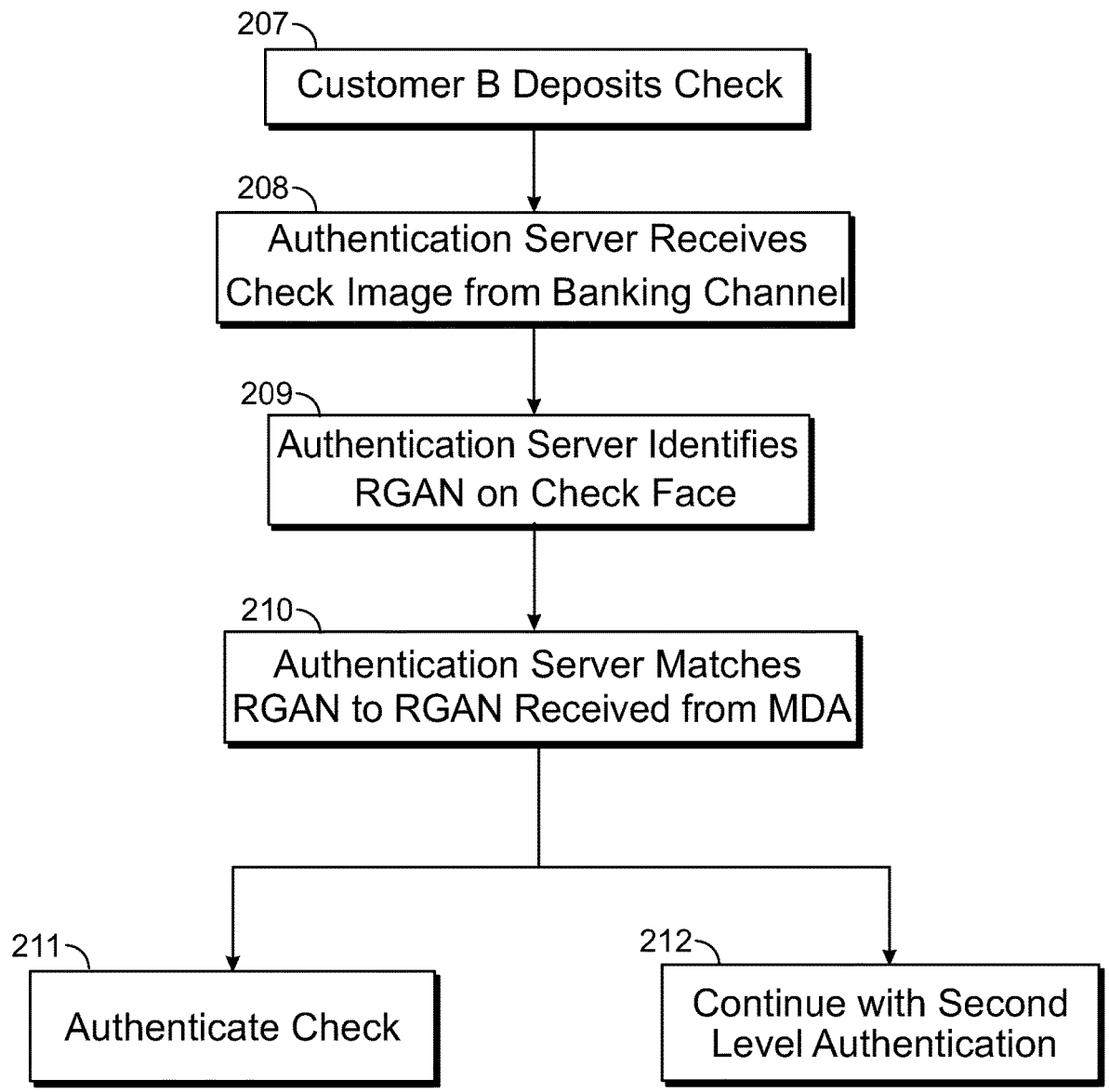
FIG. 2B shows an illustrative process flow in accordance with principles of the invention.

FIGS. 2A and 2B show two parts of illustrative process flow 200. One or more of the steps shown in process 200 may correspond to steps shown in FIGS. 1A and 1B. Process 200 shows a biometric authentication process for a paper check. In process 200, Customer A may be a customer of a financial institution. At step 201, Customer A issues a check. The check may be issued as part of a payment to Customer B.

Customer A may be in possession of a mobile device. A mobile device application (MDA) for biometric authentication may be installed on the mobile device. The MDA may be provided by the financial institution. The MDA may be downloaded by Customer A from the financial institution.

At step 202, the MDA captures an image of the issued check before it is transferred to Customer B. The MDA may offer Customer A an option to associate the check image with a biometric input. At step 203, the MDA captures a biometric input from Customer A. The biometric input may be a fingerprint scan, a retinal scan, a voiceprint, a photograph, a heartbeat signature or any other suitable biometric input. The MDA may be configured to receive the biometric input using a mobile device touchscreen, camera, scanner, voice recorder or any other suitable function of the mobile device.

At step 204, in response to capture of the biometric input, the MDA generates a randomly generated authentication number (RGAN). The RGAN is evidence of biometric confirmation of the check image, but the RGAN itself does not include any biometric information. At step 205, Customer A transfers the RGAN to the face of the issued paper check. At step 206, the MDA transmits the RGAN to a server for storage. The server may be associated with the financial institution. The server may store transaction information. The server may be an authentication server.

FIG. 2B shows additional elements of process flow 200, following transfer of the paper check to Customer B. At step 207, Customer B deposits the check issued by Customer A. Customer B may deposit the check at a self-service kiosk, via online banking, via a mobile device, at financial center or via any other suitable banking channel. The banking channel may capture an image of the deposited check. The banking channel may transmit the check image to an authentication server for authentication.

At step 208, the authentication server receives the check image for authentication. At step 209, the authentication server identifies a RGAN in the check image. The RGAN may be extracted from a segment of the check image. At step 210, the RGAN from the check image may be compared to the stored RGAN. At step 211, if the RGANs match, the authentication server authenticates the check. At step 212, if the RGANs do not match, the authentication process continues with an alternate form of authentication.

Figure 3:
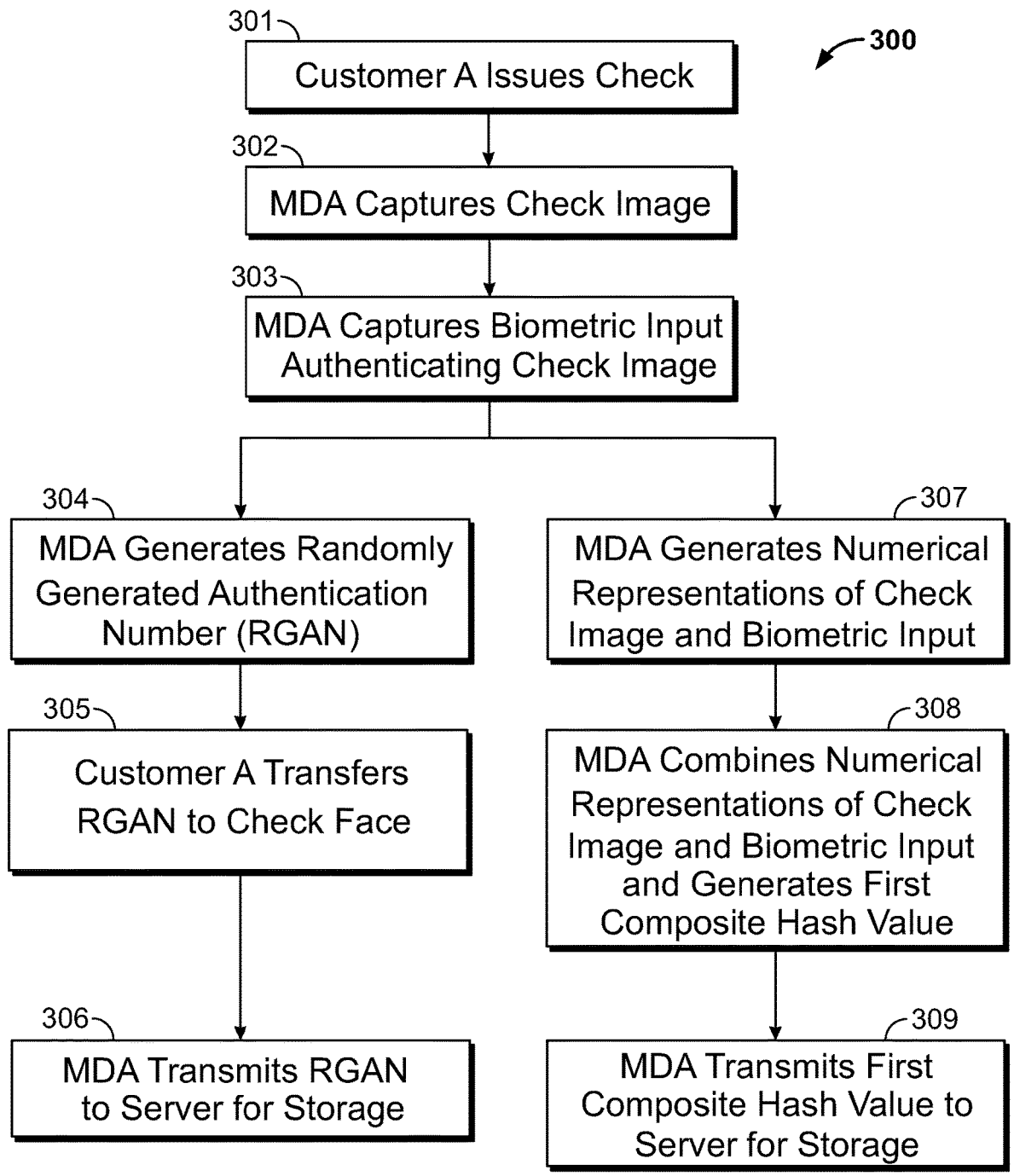
FIG. 3 shows an illustrative process flow in accordance with principles of the invention.

FIG. 3 shows illustrative process flow 300. One or more of the steps shown in FIG. 3 may correspond to steps shown in FIGS. 1A, 1B, 2A and 2B. Process 300 shows association of biometric authentication information with a paper check. In process 300, a MDA generates both a composite hash value and an RGAN to prepare an issued check for multiple paths of biometric authentication.

Figure 4:
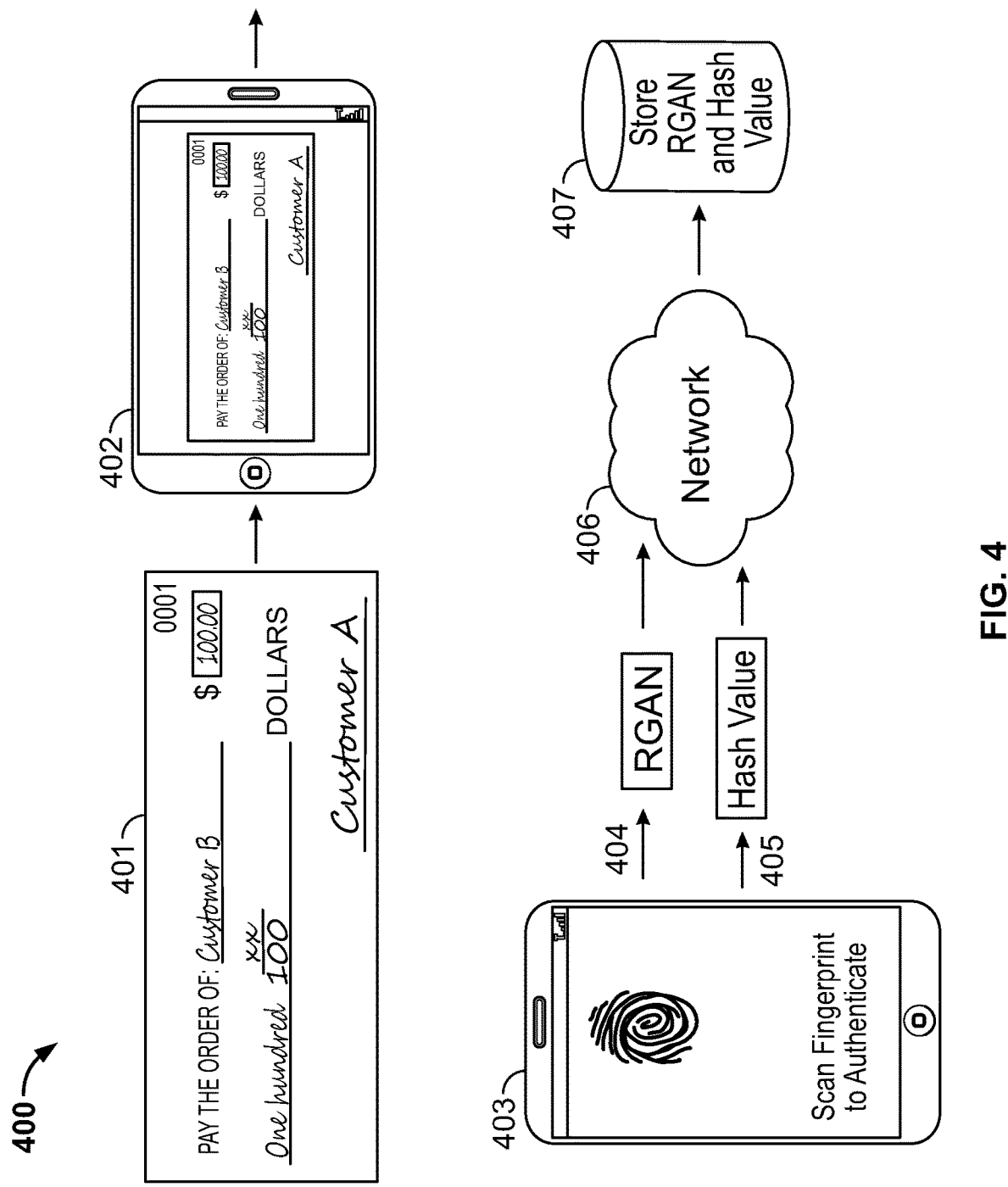
FIG. 4 shows an illustrative process flow and apparatus in accordance with principles of the invention.

FIG. 4 shows hybrid apparatus/process flow 400. Step 401 shows a check issued by Customer A. Step 402 shows an image of the check captured by Customer A at a mobile device. Step 403 shows capture of a biometric input from Customer A. At steps 404 and 405, the mobile device generates a RGAN and a composite hash value for use in subsequent authentication of the check. The mobile device transmits the RGAN and the composite hash value via network 406. The RGAN does not include biometric information. The composite hash value includes protected biometric information that has been converted to a numeric representation and protected by convolution with a numeric representation of the check image prior to hashing. The transmitted RGAN and the transmitted composite hash value are stored securely on server 407.

Figure 5:
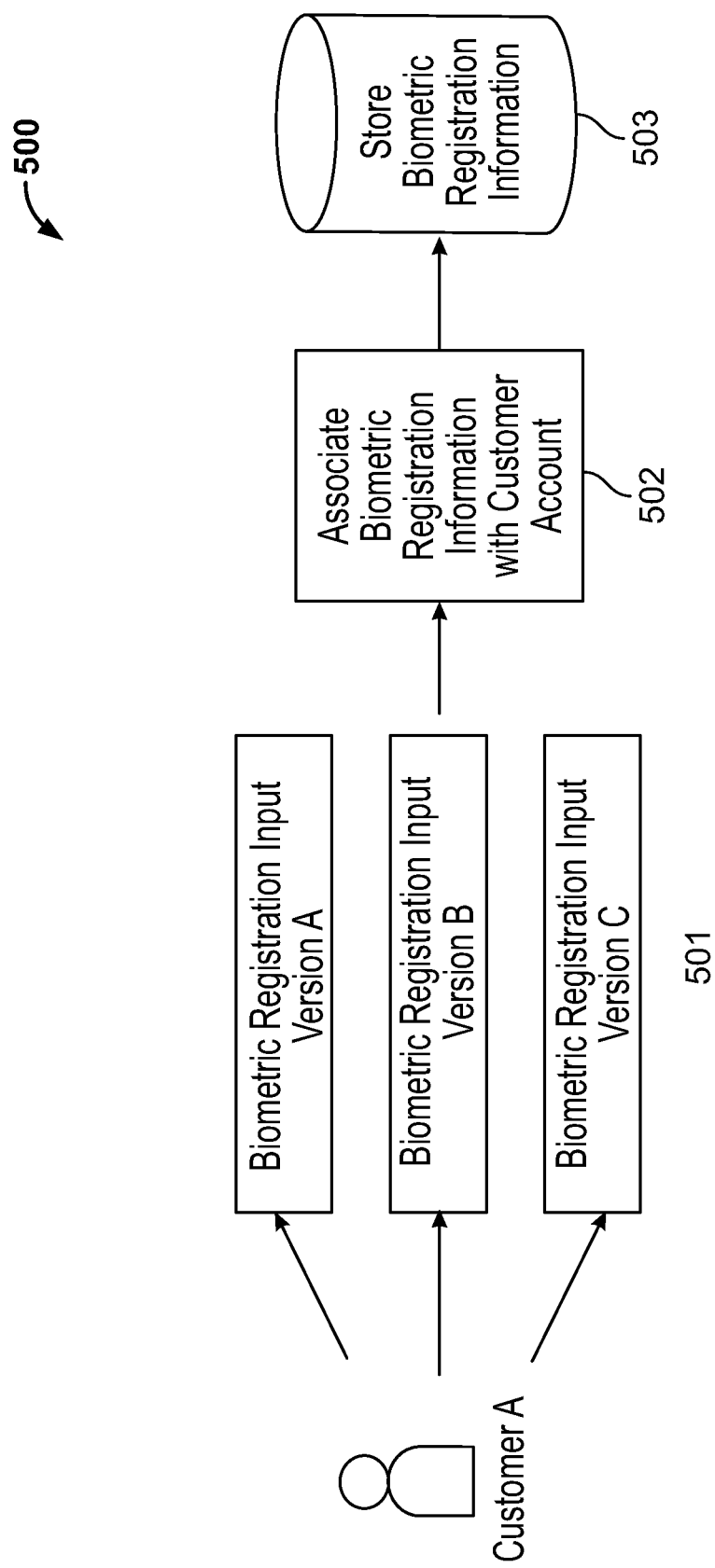
FIG. 5 shows an illustrative process flow in accordance with the principles of the invention.

FIG. 5 shows illustrative process flow 500. In process 500, Customer A registers biometric information with a financial institution. At step 501, Customer A enters a biometric registration input. The biometric registration input may be a fingerprint scan, a retinal scan, a photograph, a voiceprint, a heartbeat signature or any suitable biometric registration input. Customer A enters multiple versions of the biometric input. For example, if the biometric input is a fingerprint scan, Customer A may scan the fingerprint three separate times, each time slightly shifting the position of the finger on the scanner.

At step 502, the biometric registration information is associated with a Customer A account. This association facilitates access to the biometric registration information for subsequent authentication of a document that is also associated with the account. At step 503, the biometric registration information is stored on a secure financial institution server.

Thus, methods and apparatus for protected biometric authentication of a paper-based transaction have been provided. Persons skilled in the art will appreciate that the present invention can be practiced by other than the described embodiments, which are presented for purposes of illustration rather than of limitation. The present invention is limited only by the claims that follow.

What is claimed is:

1. A system for protecting biometric authentication information associated with a paper check based, at least in part, on a convolution of a biometric input and a check image, the system comprising:
 a check issuer device configured to pre-associate a paper check with biometric authentication information, the device comprising:
 a camera configured to capture a first image of a paper check;

a biometric scanner configured to capture a first biometric input from the check issuer; and
a first processor configured to:
convert the first check image to a numerical representation of the first check image;
convert the first biometric input to a numerical representation of the first biometric input; and
generate a first composite hash value, the first composite hash value based on a convolution of the numerical representation of the first check image and the numerical representation of the first biometric input; and
an authentication device configured to authenticate a paper check, the authentication device comprising:
a receiver configured to receive a second image of a paper check from a banking channel; and
a second processor configured to:
based on one or more data segments extracted from the second check image, identify a check issuer account associated with the second check image;
retrieve a second biometric input previously associated with the check issuer account;
convert the second check image to a numerical representation of the second check image;
convert the second biometric input to a numerical representation of the second biometric input;
generate a second composite hash value, the second composite hash value based on a combination of the numerical representation of the second check image and the numerical representation of the second biometric input;
when an edit distance separating the second composite hash value from the first composite hash value is less than a predetermined threshold distance, authenticate the check, the authentication comprising transmitting an instruction to release funds from the check issuer account; and
when the edit distance separating the second composite hash value from the first composite hash value is greater than a predetermined threshold distance, lock the check issuer account, the locking comprising transmitting an instruction denying a release of funds from the check issuer account.

2. The system of claim 1 wherein:
the first biometric input and the numerical representation of the first biometric input are restricted to the check issuer device; and
the first composite hash number is not restricted to the check issuer device.

3. The system of claim 1 wherein the second biometric input comprises multiple versions of a biometric input.

4. The system of claim 3 wherein the second processor is configured to:
generate multiple versions of the second composite hash value, each version of the second composite hash value based on a combination of the numerical representation of the second check image and a numerical representation of a version of the second biometric input;
authenticate the check when an edit distance separating any version of the second composite hash value from the first composite hash value is less than the predetermined threshold distance; and
deny authentication of the check when the edit distance separating every version of the second composite hash value from the first composite hash value is greater than the predetermined threshold distance.

5. The system of claim 1 wherein the first processor is further configured to:
generate a first randomly generated authentication number (RGAN) for transfer to the face of the paper check; and
associate the first RGAN with stored transaction information for the paper check.

6. The system of claim 5 wherein the second processor is further configured to:
based on one or more data segments extracted from the second check image, identify a second RGAN associated with the second check image;
based on one or more data segments extracted from the second check image, identify transaction information associated with the second check image, the transaction information comprising the first RGAN; and
generate the second composite hash value when the second RGAN does not correspond to the first RGAN.

7. A method for protecting biometric authentication information associated with a paper check based on convolution of a biometric input and a check image, the method comprising:
at a check issuer device, pre-associating a paper check with biometric authentication information from a check issuer, the pre-association comprising:
capturing a first image of the paper check
capturing a first biometric input using the check issuer device, and
converting the first biometric input and the first image to a first composite hash value, the first composite hash value based, at least in part, on convolution of a numerical representation of the first check image and the numerical representation of the first biometric input;
wherein, the first biometric input and the numerical representation of the first biometric input are deleted from the check user device following generation of the first composite hash value; and
at an authentication device, authenticating a paper check based, at least in part, on pre-associated biometric authentication information, the authentication comprising:
capturing a second image of the paper check;
based on one or more data segments extracted from the second image, identifying a check issuer account;
retrieving a second biometric input previously associated with the check issuer account and stored within a secure banking portal;
converting the second biometric input and the second image to a second composite hash value, the second composite hash value based, at least in part, on a convolution of a numerical representation of the second check image and a numerical representation of the second biometric input;
when an edit distance between the second composite hash value and the first composite hash value is less than a predetermined threshold distance, authorizing a release of funds from the check issuer account; and
when the edit distance between the second composite hash value and the first composite hash value is greater than a predetermined threshold distance, locking the check issuer account, the locking comprising denying a release of funds.

8. The method of claim 7 wherein the second biometric input comprises multiple versions of a biometric input.

9. The method of claim 8 further comprising:

generating multiple versions of the second composite hash value, each version of the second composite hash value based on a combination of the numerical representation of the second check image and a numerical representation of a version of the second biometric input;

authorizing a release of funds when an edit distance separating any version of the second composite hash value and the first composite hash value is less than the predetermined threshold distance; and denying a release of funds when the edit distance separating every version of the second composite hash value and the first composite hash value is greater than the predetermined threshold distance.

10. The method of claim 7 further comprising:

generating a first randomly generated authentication number (RGAN) for transfer to the face of the paper check; and associating the first RGAN with stored transaction information for the paper check.

11. The method of claim 10 further comprising:

based on one or more data segments extracted from the second check image, identifying a second RGAN associated with the second check image;

based on one or more data segments extracted from the second check image, identifying transaction information associated with the second check information, the transaction information comprising the first RGAN; and generating the second composite hash value when the second RGAN does not correspond to the first RGAN.

* * * * *